D. M. KNOX.
BRAKE BEAM SAFETY SUPPORT.
APPLICATION FILED AUG. 30, 1911.
1,024,789.
Patented Apr. 30, 1912.
2 SHEETS—SHEET 1.
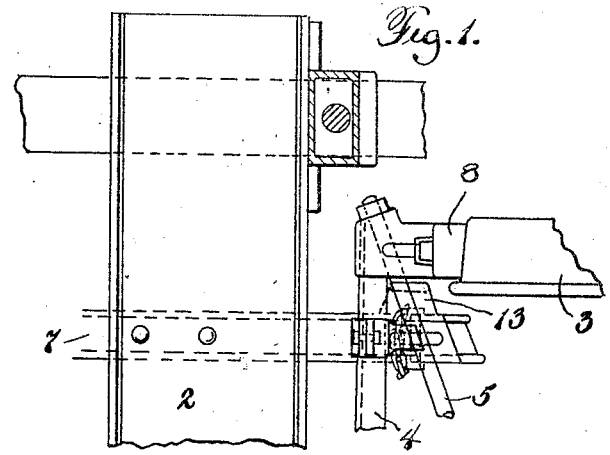
Fig. 1.
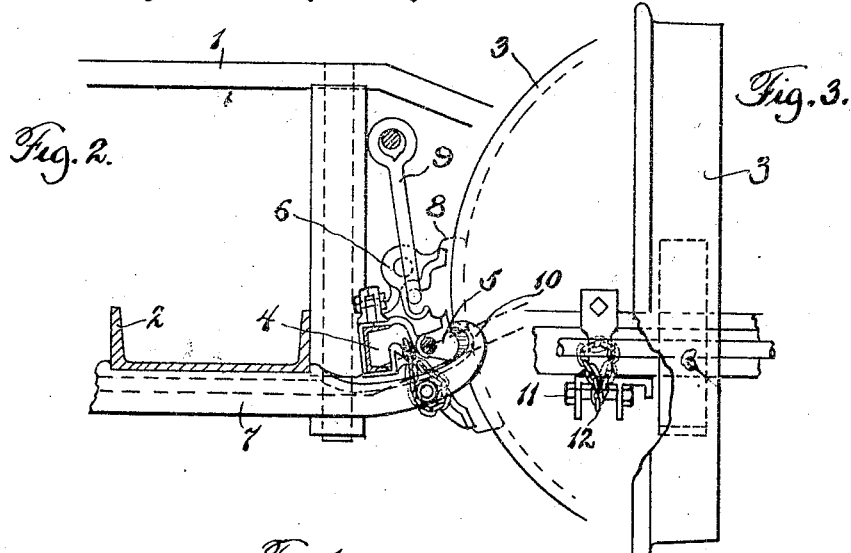
Fig. 2.
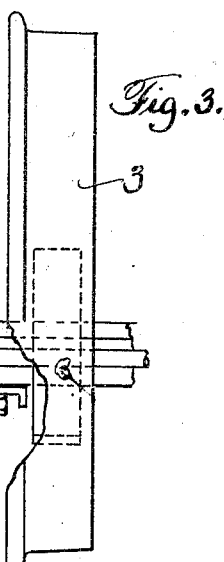
Fig. 3.
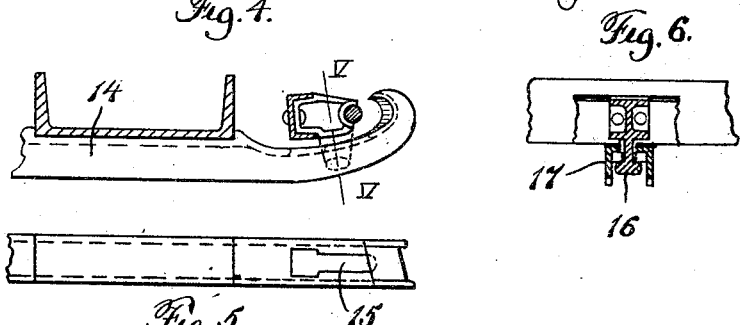
Fig. 4.
Fig. 5.
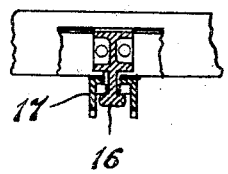
Fig. 6.
WITNESSES
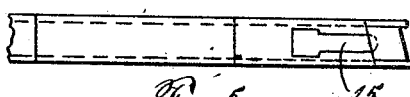
INVENTOR
David M. Knox
by atty
Paul Synnestvedt D. M. KNOX.
BRAKE BEAM SAFETY SUPPORT.
APPLICATION FILED AUG. 30, 1911.
1,024,789.
Patented Apr. 30, 1912.
2 SHEETS—SHEET 2.
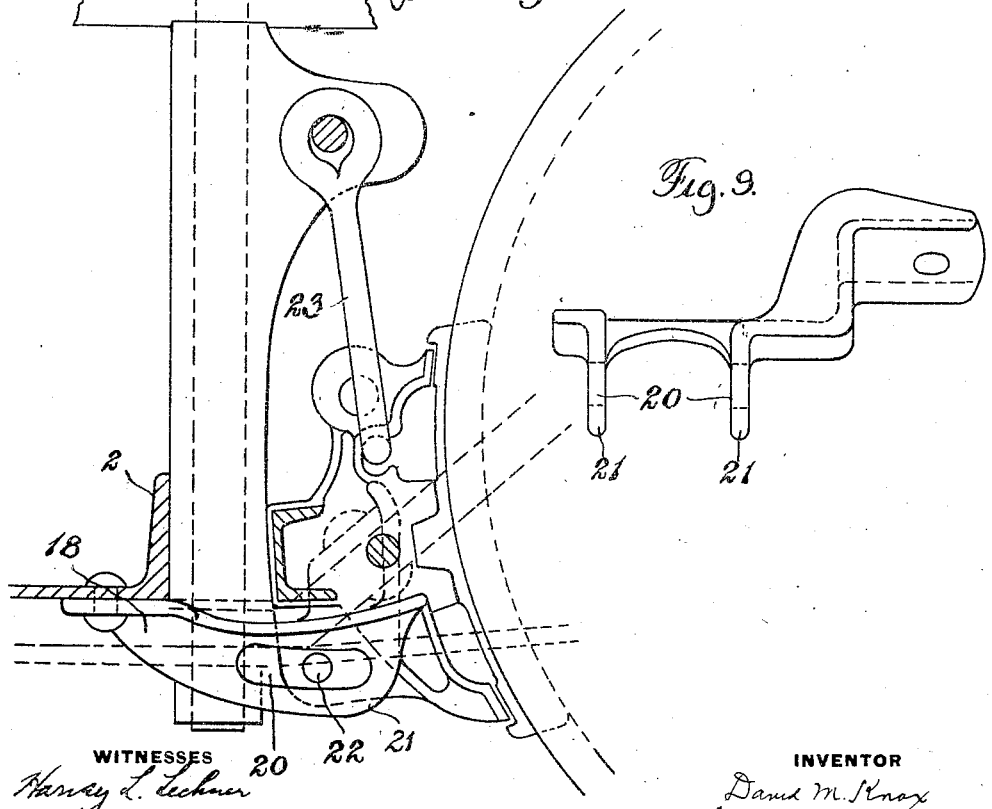

UNITED STATES PATENT OFFICE.

DAVID M. KNOX, OF ST. LOUIS, MISSOURI, ASSIGNOR OF ONE-HALF TO WILLIAM J. KNOX, OF DUBOIS, PENNSYLVANIA.

BRAKE-BEAM SAFETY-SUPPORT.

1,024,789.

Specification of Letters Patent.

Patented Apr. 30, 1912.

Application filed August 30, 1911. Serial No. 646,867.

*To all whom it may concern:*

Be it known that I, DAVID M. KNOX, a citizen of the United States, residing at St. Louis, in the State of Missouri, have invented certain new and useful Improvements in Brake-Beam Safety-Supports, of which the following is a specification.

The invention relates to a safety means for use with brake beams, and to means for limiting the movements of the brake beam. The invention has for its primary objects; the provision of an improved and simplified means for supporting the brake beam against movement in both directions in case of a failure of the hangers; the arrangement and positioning of means of the character above referred to in an advantageous manner; and the provision of improved means for limiting the endwise movement of the brake beam and so maintaining the brake shoes in proper engagement with the treads of the wheels. One embodiment of the invention is illustrated in the accompanying drawings, wherein:—

Figure 1 is a section taken through the truck frame just above the brake beam and above my improved safety support showing such parts in plan view; Fig. 2 shows my improvement as applied to a car truck in side elevation; Fig. 3 is an end elevation of the construction of Figs. 1 and 2; Figs. 4, 5 and 6 are detail views showing a modification; Fig. 4 being a side elevation, Fig. 5 a plan view and Fig. 6 a section on the line V—V of Fig. 4; Figs. 7 and 8 are plan and side elevation views respectively of another modification; and Fig. 9 is an end elevation of the bracket employed in the constructions of Figs. 7 and 8.

Referring first to the construction as shown in Figs. 1, 2 and 3: 1 is the side frame of the truck, which may be of any approved construction; 2 is a cross tie extending between the side frames; 3 is the wheel of the car; 4 is the brake beam, having the usual cross rod 5; and a brake shoe carrier 6; 7 is my improved safety support or bracket; and 8 is one of the brake shoes, it being understood that the construction at the other end of the brake beam which is not shown, is a duplicate of the construction which is shown in Figs. 1, 2 and 3, there being two of the safety supports or brackets 7 lying intermediate the brake shoes. The brake beam is supported by the usual hangers 9.

In the particular construction illustrated the bracket 7 is riveted to the underside of the cross tie 2, with its front end projecting beneath the brake beam, so that in case of a failure of the hangers 9 the brake beam will rest upon the brackets and be supported thereby. The front end of the bracket 7 is recurved as indicated at 10, in order to form a stop against which the member 5 of the brake beam will engage in the case the shoe becomes entirely worn out or broken, the brake beam thus being held against undue forward movement which might otherwise cause injury to the brake shoe carrier or to the brake beam itself. In order to prevent upward movement of the brake beam in case of a failure of the hangers 9, a bolt 11 is provided (Fig. 3) extending through the flanges of the bracket, and to this is secured the chain 12, such chain being secured at its upper end to the brake shoe carrier. The bracket 7 is slotted in order to permit the passage of the chain, and the connection is a sufficiently loose one, so that there is no interference with the movement of the brake beam toward and from the wheels. In order to prevent undue endwise movement of the brake beam, such as would permit the brake shoes to move from their proper positions in engagement with the treads of the wheels, the stop members 13 (Fig. 1) are provided, such stop members being carried by the bracket 7 and arranged in position to engage the brake shoe carriers.

It will be seen from the foregoing description that the safety device with the various parts carried thereby is located between the brake shoes and to the inside of the wheels, thus providing a very compact arrangement and one which is out of the way of any possible interference with other parts. It will be understood that the invention is not limited to the precise construction shown. The chain 12 is preferably employed, but any other type of connection permitting the necessary movement might be employed. The particular type of stops for preventing endwise movement of the brake beam is also unimportant, as a wide variety of engaging means might be employed for preventing undue longitudinal movement of the brake beam. The bracket 7 is illustrated as a separate member attached to the truck frame, but if desired this bracket may be made as an integral portion of the truck framing.

In Figs. 4, 5 and 6 a modified type of bracket and connection to the brake beam are illustrated. In this construction the bracket 14 is provided with a key hole slot 15 (Fig. 5), and the brake beam is provided with an engaging member 16 (Fig. 6), which fits into the slot 15, and prevents upward movement of the brake beam with respect to the bracket, and also prevents endwise movement of the beam. When it is desired to remove the beam from its connection with the bracket 14, it is moved to the rear until the head of the member 16 comes opposite the enlarged portion in the slot 15, at which time the beam may be removed vertically. Various other types of flanged sections might be employed in place of the channel sections 17 (Fig. 6), and the connection to permit a sliding but not a vertical movement might be made in a variety of ways without departing from the spirit of the invention shown in Figs. 4, 5 and 6, and in Figs. 1, 2 and 3.

Figs. 7, 8 and 9 illustrate still another modification of my invention. As here shown the bracket 18 is provided with a jaw shaped portion 19 which embraces the brake shoe carrier so that movement in a lateral direction is prevented. The bracket is also provided with slots 20 in its flanges 21 (Fig. 9), which slots are engaged by a pin 22 carried by the brake shoe carrier, so that a movement of the brake beam toward and from the wheels is permitted while vertical movement is prevented in case of a failure of the hangers 23. The bracket 18 is in this case riveted both to the cross tie member 2 and to the side frame member 1 (Fig. 7). The pin and slot connections 20, 22 may be readily reversed if desired.

Having thus described my invention and illustrated its use, what I claim as new and desire to secure by Letters Patent is the following:—

1. In a car truck, side frames in the form of trusses with the car wheels at their ends, a cross tie between the central portions of the side frames, a brake beam, shoes carried thereby, and a safety bracket on the cross tie intermediate the brake shoes and positioned so as to support the brake beam in case of a failure of the means for suspending the brake beam.

2. In a car truck, side frames, a cross tie between the side frames, a brake beam, shoes carried thereby, and a pair of safety brackets secured to the bottom of the cross tie with their free ends projecting beneath the brake beam so as to support the brake beam in case of a failure of the means for suspending the brake beam.

3. In a car truck, a brake beam, shoes carried thereby and stop means carried by the frame-work of the truck intermediate the shoes for preventing undue endwise movement of the brake beam.

4. In a car truck, a brake beam, shoes carried thereby and a pair of stop members lying between the shoes for preventing undue endwise movement of the brake beam.

5. In a car truck, a brake beam, shoes carried thereby, a safety bracket carried by the framework of the truck intermediate the brake shoes and positioned so as to support the brake beam in case of a failure of the means for suspending the brake beam, and means on the bracket intermediate the shoes for preventing undue endwise movement of the brake beam.

6. In a car truck, a brake beam, shoes carried thereby, a pair of safety brackets carried by the truck intermediate the brake shoes and positioned so as to support the brake beam in case of a failure of the means for suspending the brake beam, and means on the brackets intermediate the shoes for preventing undue endwise movement of the brake beam.

7. In a car truck, a brake beam, shoes carried thereby, and a safety bracket carried by the central portion of the frame-work of the truck intermediate the shoes and constructed so as to support the brake beam against vertical movement in either direction in case of a failure of the means for suspending the brake beam.

8. In a car truck, a brake beam, shoes carried thereby, and a safety bracket carried by the central portion of the frame-work of the truck intermediate the brake shoes and positioned so as to support the brake beam in case of a failure of the means for suspending the brake beam, the said bracket being provided with means for limiting the movement of the brake beam toward the car wheels.

9. In a car truck, a brake beam, shoes carried thereby, a safety bracket carried by the frame-work of the truck and projecting beneath the brake beam, and a connecting means extending downward from the brake beam and engaging the bracket to prevent upward movement of the brake beam and at the same time permit movement thereof toward and from the wheels.

10. In a car truck, a brake beam, shoes carried thereby, a safety bracket carried by the frame-work of the truck intermediate the brake shoes, and projecting beneath the brake beam, and a connecting means extending downward from the brake beam, and engaging the bracket to prevent upward movement of the brake beam and at the same time permit movement thereof toward and from the wheels.

In testimony whereof I have hereunto signed my name in the presence of the two subscribed witnesses.

DAVID M. KNOX.

Witnesses:
    WILLIAM H. V. ROSING,
    CLINTON C. MURPHY.